US012713285B2

(12) United States Patent
Fu et al.

(10) Patent No.: US 12,713,285 B2
(45) Date of Patent: Aug. 18, 2026

(54) QUALITY OF SERVICE ADJUSTMENT METHOD AND APPARATUS, DEVICE, AND MEDIUM

(71) Applicant: GUANGDONG OPPO MOBILE TELECOMMUNICATIONS CORP., LTD., Dongguan (CN)

(72) Inventors: Zhe Fu, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 321 days.

(21) Appl. No.: 18/397,469

(22) Filed: Dec. 27, 2023

(65) Prior Publication Data

US 2024/0129789 A1 Apr. 18, 2024

Related U.S. Application Data

(63) Continuation of application No. PCT/CN2021/108150, filed on Jul. 23, 2021.

(51) Int. Cl.
*H04W 28/02* (2009.01)
*H04L 43/0829* (2022.01)
(Continued)

(52) U.S. Cl.
CPC ..... *H04W 28/0268* (2013.01); *H04L 43/0829* (2013.01); *H04W 76/20* (2018.02); *H04W 84/042* (2013.01)

(58) Field of Classification Search
CPC ............. H04W 28/0268; H04W 76/20; H04W 84/042; H04W 76/22; H04W 76/27;
(Continued)

(56) References Cited

U.S. PATENT DOCUMENTS 11,356,888 B2 * 6/2022 Li ......................... H04W 40/24
2020/0112907 A1 * 4/2020 Dao .................. H04M 15/8016
2024/0187932 A1 * 6/2024 Zhu ................... H04W 28/0992

FOREIGN PATENT DOCUMENTS

CN 101656997 A 2/2010
CN 103731887 A 4/2014
(Continued)

OTHER PUBLICATIONS

International Search Report and Written Opinion dated Apr. 26, 2022 in International Application No. PCT/CN2021/108150. English translation attached.

(Continued)

*Primary Examiner* — Cheikh T Ndiaye
(74) *Attorney, Agent, or Firm* — Sheppard, Mullin, Richter & Hampton LLP

(57) ABSTRACT

The present disclosure discloses a Quality of Service (QoS) adjustment method and apparatus, a device, and a medium, which relate to the field of communications. The method includes: transmitting, by a first network entity, first information to a second network entity. The first information is used to adjust a transmission demand or a QoS parameter or a QoS configuration. The first information comprises at least one of: information related to an air interface; information related to a Radio Access Network (RAN); or information related to a terminal.

11 Claims, 5 Drawing Sheets

(51) Int. Cl.
*H04W 76/20* (2018.01)
*H04W 84/04* (2009.01)

(58) Field of Classification Search
CPC .. H04W 28/16; H04L 43/0829; H04L 41/142; H04L 43/0823; H04L 43/0852; H04L 43/0876; H04L 41/0816
See application file for complete search history.

(56) References Cited

FOREIGN PATENT DOCUMENTS

| | | | | |
|---|---|---|---|---|
| CN | 111050355 | A | 4/2020 | |
| JP | 2013066188 | A | 4/2013 | |
| WO | WO-2019065617 | A1 * | 4/2019 | ............ H04W 28/02 |
| WO | WO-2021023425 | A1 * | 2/2021 | ........ H04W 28/0268 |

OTHER PUBLICATIONS

Huawei et al. "Use Case: Dynamic QoS Adjustment" SA WG2 Meeting #126 S2-181962,Mar. 2, 2018 (Mar. 2, 2018) entire document.
"3rd Generation Partnership Project; Technical Specification Group Radio Access Network;NR;Layer 2 Measurements; (Release 16)",3GPP TS 38.314 V16.3.0,Mar. 2021.
Extended European search report of counterpart European application No. 21950554.2 issued on Aug. 14, 2024.

* cited by examiner

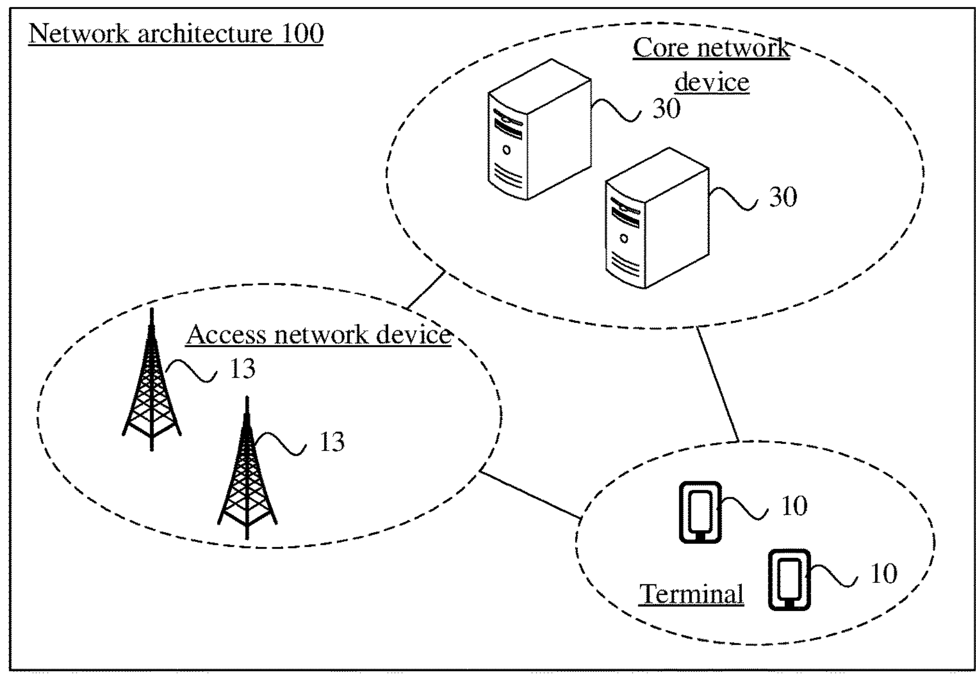
FIG. 1
Transmitting, by a first network entity, first information to a second network entity, the first information being used to adjust a transmission demand or a QoS parameter or a QoS configuration.
102
FIG. 2
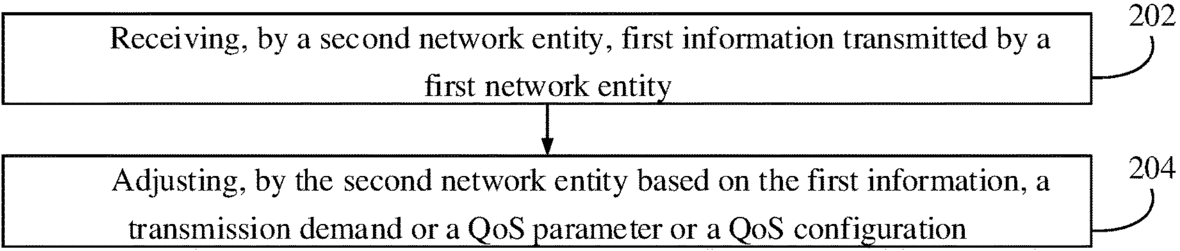
FIG. 3

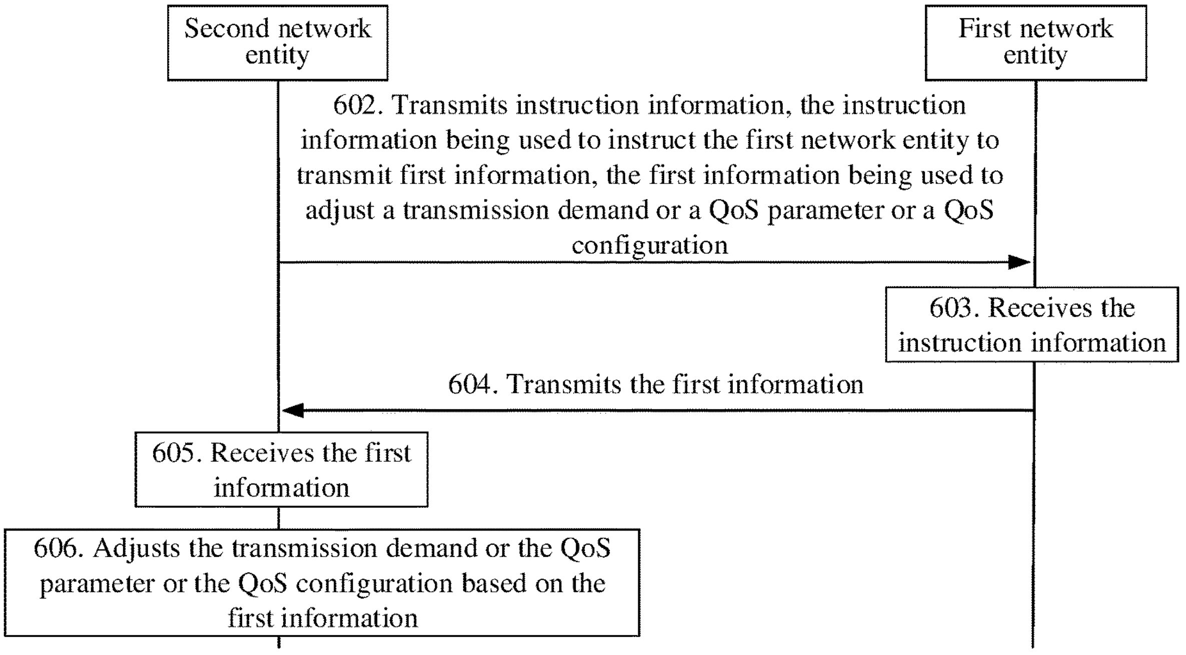

FIG. 7

Second network entity

First network entity

702. Measures or collets first information, the first information being used to adjust a transmission demand or a QoS parameter or a QoS configuration 703. Transmits the first information 704. Receives the first information 705. Adjusts the transmission demand or the QoS parameter or the QoS configuration based on the first information

FIG. 8

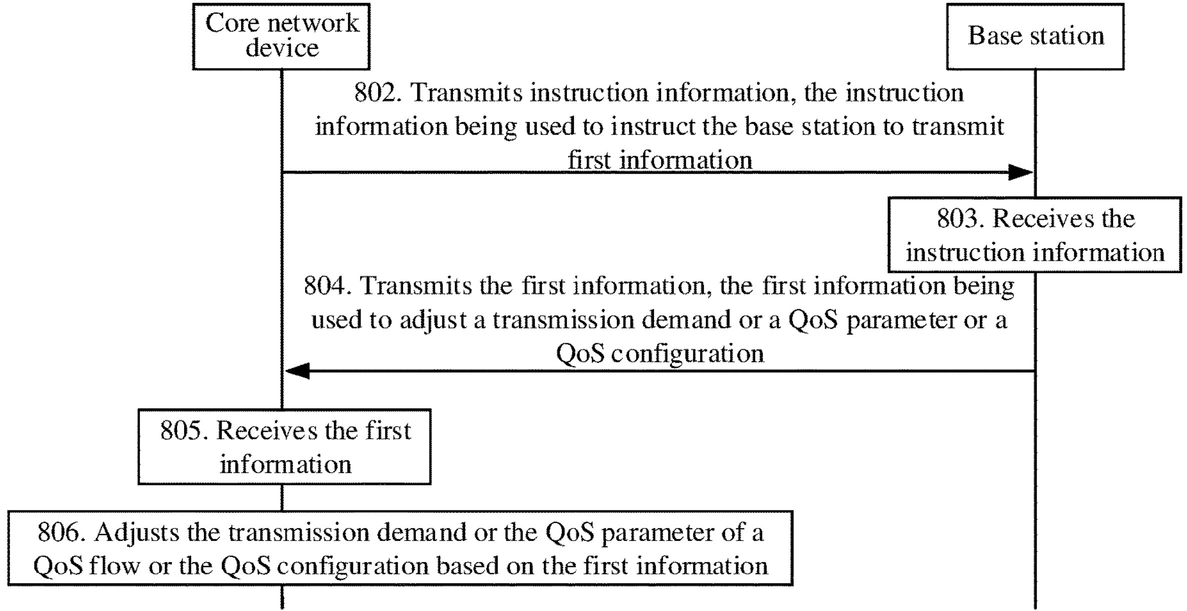

FIG. 9

Core network device

Terminal

902.Transmits instruction information, the instruction information being used to instruct the terminal to transmit first information 903. Receives the instruction information 904.Transmits first information, the first information being used to adjust a transmission demand or a QoS parameter or a QoS configuration 905. Receives the first information 906. Adjusts the transmission demand or the QoS parameter of a QoS flow or the QoS configuration based on the first information

FIG. 10

QUALITY OF SERVICE ADJUSTMENT METHOD AND APPARATUS, DEVICE, AND MEDIUM

CROSS-REFERENCE TO RELATED APPLICATIONS

This application is a continuation of International Application No. PCT/CN2021/108150 filed on Jul. 23, 2021, and entitled "QUALITY OF SERVICE ADJUSTMENT METHOD AND APPARATUS, DEVICE, AND MEDIUM", the entire contents of which are incorporated herein by reference.

FIELD

The present disclosure relates to the field of communications, and more particularly, to a Quality of Service (QoS) adjustment method and apparatus, a device, and a medium.

BACKGROUND

In New Radio (NR), QoS is usually determined by a Core Network (CN) based on service information. In the related art, an adjustment of QoS is usually performed by a Policy Control Function (PCF) in granularity units of QoS flows, and thus there is a possibility of poor transmission capacity at lower layers, which will lead to congestion at higher layers (e.g., application congestion), resulting in a poor communication quality.

SUMMARY

Embodiments of the present disclosure provide a QoS adjustment method and apparatus, a device, and a medium. Technical solutions are provided as follows.

In an aspect of the present disclosure, a QoS adjustment method is provided. The method includes: transmitting, by a first network entity, first information to a second network entity. The first information is used to adjust a transmission demand or a QoS parameter or a QoS configuration. The first information comprises at least one of: information related to an air interface; information related to a Radio Access Network (RAN); or information related to a terminal.

In an aspect of the present disclosure, a first network entity is provided. The first network entity includes a processor and a memory. The memory stores at least one program code. The at least one program code is loaded and executed by the processor to implement the QoS adjustment method described above. The first information comprises at least one of: information related to an air interface; information related to a Radio Access Network (RAN); or information related to a terminal.

In an aspect of the present disclosure, a second network entity is provided. The second network entity includes a processor and a memory. The memory stores at least one program code. The at least one program code is loaded and executed by the processor to implement a QoS adjustment method, comprising: receiving first information transmitted by a first network entity; and adjusting, based on the first information, a transmission demand or a QoS parameter or a QoS configuration. The first information comprises at least one of: information related to an air interface; information related to a Radio Access Network (RAN); or information related to a terminal.

BRIEF DESCRIPTION OF THE DRAWINGS

In order to clearly explain technical solutions of embodiments of the present disclosure, drawings used in the description of the embodiments are briefly described below. Obviously, the drawings as described below are merely some embodiments of the present disclosure. Based on these drawings, other drawings can be obtained by those skilled in the art without creative effort.

FIG. 1 is a block diagram showing a communication system according to an example embodiment of the present disclosure.

FIG. 2 is a flowchart illustrating a QoS adjustment method according to an example embodiment of the present disclosure.

FIG. 3 is a flowchart illustrating a QoS adjustment method according to an example embodiment of the present disclosure.

FIG. 7 is a flowchart illustrating a QoS adjustment method according to an example embodiment of the present disclosure.

FIG. 8 is a flowchart illustrating a QoS adjustment method according to an example embodiment of the present disclosure.

FIG. 9 is a flowchart illustrating a QoS adjustment method according to an example embodiment of the present disclosure.

FIG. 10 is a flowchart illustrating a QoS adjustment method according to an example embodiment of the present disclosure.

DETAILED DESCRIPTION

Figure 4:
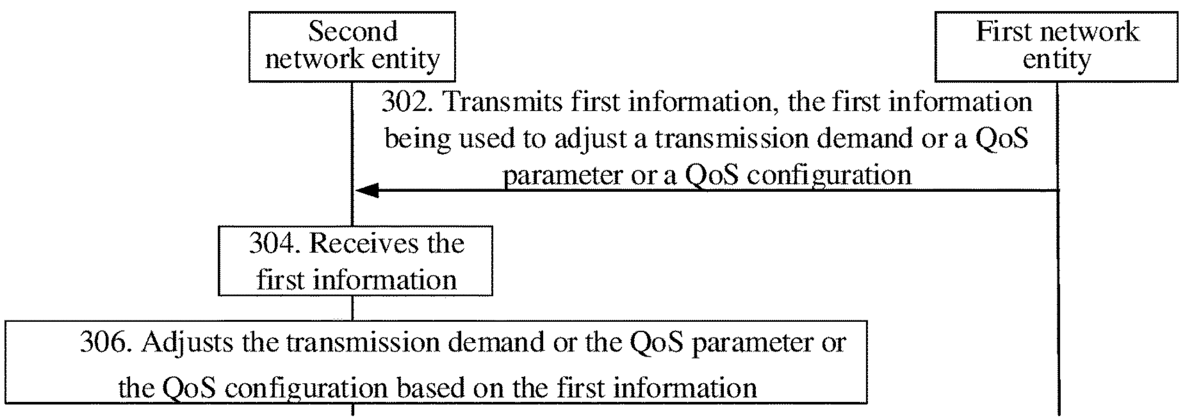
FIG. 4 is a flowchart illustrating a QoS adjustment method according to an example embodiment of the present disclosure.

In order to make the objects, technical solutions, and advantages of the present disclosure more apparent, embodiments of the present disclosure will be described in detail below with reference to the accompanying drawings and embodiments.

Network architecture and service scenarios described in the embodiments of the present disclosure are for the purpose of more clearly explaining, rather than limiting, the technical solutions of the embodiments of the present disclosure. It is conceivable for those skilled in the art that, with the evolution of the network architecture and the emergence of new service scenarios, the technical solutions provided by the embodiments of the present disclosure are equally applicable to similar technical problems.

FIG. 1 illustrates a block diagram showing a communication system according to an example embodiment of the present disclosure. The communication system may include a terminal 10, an access network device 20, and a core network device 30.

The terminal 10 may also be referred to as User Equipment (UE), an access terminal, a user unit, a user station, a mobile station, a mobile platform, a remote station, a remote terminal, a mobile device, a wireless communication device, a user agent, or a user apparatus. Optionally, the terminal 10 may further be a cellular phone, a cordless phone, a Session Initiation Protocol (SIP) phone, a Wireless Local Loop (WLL) station, a Personal Digital Assistant (PDA) device, a handheld device having a wireless communication function, a computing device or other processing devices connected to a wireless modem, a vehicle-mounted device, a wearable device, a terminal device in a 5-th Generation Mobile Communication Technology (5G) system, or a terminal device in a future-evolved Public Land Mobile Network (PLMN) network, etc. The embodiments of the present disclosure are not limited in this regard.

For ease of description, the devices mentioned above are collectively referred to as terminals. Usually, a plurality of terminals 10 is provided. One or more terminals 10 may be distributed in a cell managed by each access network device 20.

The access network device 20 is a device deployed in an access network to provide wireless communication functions for the terminal 10, and may include various forms such as macro base station, micro base station, relay station, access point and the like. In systems using different radio access technologies, a device serving as an access network device may have different names. For example, in a 5G NR system, the device serving as an access network device may be called gNodeB or gNB. As communication technology evolves, the name of "access network device" may change. For ease of description, in the embodiments of the present disclosure, the above-mentioned devices configured to provide wireless communication functions for the terminal 10 are collectively referred to as an access network device.

Schematically, a communication relationship may be established between the access network device 20 and the terminal 10 or between the core network devices 30. Optionally, a communication relationship may also be established between more than two terminals 10, or a communication relationship may be established between the terminal 10 and the access network device 20 of a cell in which the terminal 10 is located. For example, in a Long Term Evolution (LTE) system, the access network device 20 may be an Evolved Universal Terrestrial Radio Access Network (EUTRAN) or one or more eNodeBs in the EUTRAN; and in the 5G NR system, the access network device 20 may be an RAN or one or more gNBs in an RAN. In the embodiments of the present disclosure, the network device refers to the access network device 20, such as a base station, unless otherwise specified.

The core network device 30 is a device deployed in the core network. Functions of the core network device 30 are mainly to provide user connectivity, management of users, and a bearer for services to enable the core network device 30 to serve as a bearer network that provides an interface to an external network. For example, the core network device in the 5G NR system may include an Access and Mobility Management Function (AMF) entity, a User Plane Function (UPF) entity, a Session Management Function (SMF) entity, and the like.

In an example, the access network device 20 and the core network device 30 communicate with each other via an air interface technology, such as an NG interface in the 5G NR system. In an example, the access network device 20 and the terminal 10 communicate with each other via an air interface technology, such as a Uu interface. In an example, two terminals 10 communicate with each other via an air interface technology, such as a direct communication interface.

The "5G NR system" in the embodiments of the present disclosure may also be referred to as a 5G system or an NR system, but those skilled in the art may understand the meaning thereof. The technical solutions described in the embodiments of the present disclosure may be applicable to an LTE system, a 5G NR system, a future evolved system of the 5G NR system, and other communication systems such as a Narrow Band Internet of Things (NB-IoT) system. The present disclosure is not limited in this regard.

Before introducing the technical solutions of the present disclosure, background technical knowledge involved in the present disclosure is described.

Extended Reality (XR)/Ultra Reliability and Low-Latency Communication (URLLC):

In the future, support provided by the 3rd Generation Partnership Project (3GPP) system for vertical industries will become more extensive and deeper. For example, URLLC needs to support transmission of services such as factory automation, transport industry, and electrical power distribution in 5G systems.

XR is a general concept that at least includes Virtual Reality (VR), Augmented Reality (AR), Mixed Reality (MR), and Ho-lographic Reality (HR). XR needs to support service transmission of AR technology/VR/cloud gaming. The scheduling of resources for the terminal needs to meet a QoS demand for data transmission, thus making requirements of reliability and latency prevalent for these services. In terms of the terminal, the problem of power consumption of the terminal also needs to be solved to avoid unnecessary power consumption. Also, considering the problem of accessing of a large number of terminals supporting the service, a network capacity needs to be ensured during resource allocations.

For example, for URLLC and XR, it is necessary to support a service with a minimum of 0.5 ms, 99, 999% of a considered demand. The service may be pseudo-periodic. Schematically, there is jitter in the arrival time of a service. That is, the service will arrive at any moment in a range, rather than a definite time point. Optionally, a period of the service may be a non-integer period, e.g., 16.67 ms. In addition, the arrival time of different service flows for a same service may vary significantly. For example, for AR, a period of the UL pose is 4 ms, but a period of the UL video is 16.67 ms.

5G NR QoS:

The 5G NR system supports many QoS parameters, including 5G QoS Identifier (5QI), Allocation and Retention Priority (ARP), and bit rate.

For 5QI, it has corresponding QoS characteristics, including resource type, default priority level, packet delay budget, default maximum data burst volume, and Packet Error Rate (PER).

The resource type includes at least one of Guaranteed Bit Rate (GBR), delay-critical GBR, or non-Guaranteed Bit Rate (non-GBR).

Illustratively, QoS is for a QoS flow. For example, in an optional implementation scenario, QoS is statistics for packets of a flow, such as Packet Delay Budget. For example, in an optional implementation scenario, application performance and user experience are frame-specific.

FIG. 2 illustrates a flowchart of a QoS adjustment method according to an example embodiment of the present disclosure. The method is applied in the communication system illustrated in FIG. 1. The QoS adjustment method provided by the embodiments of the present disclosure includes operations at blocks.

At block 102, first information is transmitted to a second network entity by a first network entity.

Schematically, the first information is used to adjust a transmission demand or a QoS parameter or a QoS configuration.

The first information includes at least one of information relevant to an air interface, information relevant to an RAN, or information relevant to a terminal. For example, the first information includes a load, a bandwidth, and a frequency point of an air interface resource. For example, the first information includes an air interface channel quality and a quantity of terminals that have accessed. For example, the first information includes a transmission delay, a transmission error rate, and a packet loss rate.

Optionally, the first network entity includes at least one of a network device or a terminal. The network device at least includes an access network device, such as a gNB.

Optionally, the second network entity includes at least one of an AMF, an SMF, a PCF, an Application Function (AF), an application server, a data network node, a Central Network Control (CNC) node, or an access network device.

For example, in a case where the first network entity is an access network device such as a base station (e.g., a gNB) and the second network entity is a core network device such as an SMF, the first information includes at least one of: a quantity of activated users, an (average) packet delay or delay rate, an (average) packet loss or loss rate, an air interface channel quality, a configuration for an air interface resource, or a bandwidth of the air interface resource. The access network device is configured to report the first information to the core network device. The first information includes the quantity of activated users, the (average) packet delay or delay rate, the (average) packet loss or loss rate, the air interface channel quality, the configuration for the air interface resource, and the bandwidth of the air interface resource. The core network device is configured to adjust the QoS parameter based on the received first information.

For example, in a case where the first network entity is a terminal and the second network entity is a core network device such as an SMF, the first information includes at least one of: an average value of a particular or all QoS flows, an average value of a particular or all data streams, or an average value of a particular or all data packets of the terminal. The terminal is configured to transmit the first information to the SMF. The SMF is configured to adjust the QoS configuration based on the received first information. The particular QoS flow, which refers to one or more QoS flows, may be selected by the terminal, or the second network entity, or other network entities. The present disclosure is not limited in this regard. Accordingly, the particular data stream or data packet can be interpreted similarly, and thus details thereof will be omitted herein.

Schematically, the first information has a granularity unit of one of:

a PLMN;
an AMF;
a UPF;
an SMF;
a network device;
a cell;
a terminal;
at least two UPFs for a same service;
at least two SMFs for a same service;
at least two terminals in an active state;
at least two terminals in a connected state;
at least two terminals in an inactive state;
at least two terminals in a non-idle state;
a single QoS flow;
an average value of at least two QoS flows;
a single Packet Data Unit (PDU) session;
an average value of at least two PDU sessions;
a single data stream;
an average value of at least two data streams;
a single frame;
an average value of at least two frames;
a single data packet;
an average value of at least two data packets;
a single application;
an average value of at least two applications;
a single application data unit;
an average value of at least two application data units;
a single logical channel;
an average value of at least two logical channels;
a single carrier; and
an average value of at least two carriers.

Schematically, the QoS flow may belong to one terminal or belong to one or more terminals located in a same cell. Similarly, each of PDU sessions, data streams, frames, data packets, applications, application data units, logical channels, and carriers may belong to one terminal, or belong to one or more terminals located in a same cell, or belong to the network device, or belong to the core network device.

The average value is at least one of an arithmetic average value, a weighted average value, a squared average value, or an exponential average value. In an optional implementation scenario, the average value is a weighted average value. A weight involved may be set as practically needed. The present disclosure is not limited in this regard. Optionally, the average value may also be a median.

Similar to the above description, each of the average value of the at least two QoS flows, the average value of the at least two PDU sessions, the average value of the at least two data streams, the average value of the at least two frames, the average value of the at least two data packets, the average value of the at least two applications, the average value of the at least two application data units, the average value of the at least two logical channels, and the average value of the at least two carriers may belong to one terminal, or belong to one or more terminals located in a same cell, or belong to the network device, or belong to the core network device.

Schematically, the average value of the at least two QoS flows may be an average value of quantities of QoS flows, or an average value of one or more parameters of the QoS flows. Similarly, each of the average value of the at least two PDU sessions, the average value of the at least two data streams, the average value of the at least two frames, the average value of the at least two data packets, the average value of the at least two applications, the average value of the at least two application data units, the average value of the at least two logical channels, and the average value of the at least two carriers includes meanings of an average quantity value and an average parameter value, and thus details thereof will be omitted here.

Optionally, in a case where the granularity unit of the first information is a terminal, the first information transmitted by the first network entity to the second network entity includes at least one of: (relevant information of) the single QoS flow; the average value of (relevant information of) the at least two QoS flows; (relevant information of) the single data stream; the average value of (relevant information of) the at least two data streams; (relevant information of) the single PDU session; the average value of (relevant information of) the at least two PDU sessions; (relevant information of) the single frame; the average value of (relevant information of) the at least two frames; (relevant information of) the single data packet; the average value of (relevant information of) the at least two data packets; (relevant information of) the single application; the average value of (relevant information of) the at least two applications; (relevant information of) the single application data unit; the average value of (relevant information of) the at least two application data units; (relevant information of) the single logical channel; the average value of (relevant information of) the at least two logical channels; (relevant information of) the single carrier; or the average value of (relevant information of) the at least two carriers.

For example, the first information includes the single QoS flow, the single data stream, and the single PDU session of the terminal. For example, the first information includes an average value of all QoS flows, an average value of all logical channels, and an average value of all carriers of the terminal. For example, the first information includes the single QoS flow and the average value of all logical channels of the terminal.

Depending on the first network entity and the second network entity, the first information has a variety of optional contents. For example, the first information includes the information relevant to the air interface, which specifically includes an air interface channel quality, a configuration for an air interface resource, a bandwidth of the air interface resource, and a frequency point of the air interface resource. For example, the first information includes the information relevant to the access network device, which specifically includes a quantity of terminals that have accessed, a transmission delay, and a resource utilization rate. For example, the first information includes the information relevant to the terminal, which specifically includes uplink information transmitted by the terminal, downlink information received by the terminal, and a quantity of activated PDU sessions.

Schematically, a content of the first information includes at least one of:

uplink information;

downlink information;

the uplink information and the downlink information;

an air interface channel quality;

a quantity of terminals that have accessed;

a quantity of activated PDU sessions;

a transmission delay;

a transmission error rate;

a packet loss rate;

a resource utilization rate;

a Listen Before Talk (LBT) failure probability;

a configuration for an air interface resource;

a load of the air interface resource;

a bandwidth of the air interface resource;

a frequency point of the air interface resource; or a statistical duration.

The above contents may belong to the first network entity, or belong to the second network entity. Optionally, the above contents may belong to the terminal, or belong to the network device, or belong to the core network device. For example, the first network entity is the terminal, and the second network entity is the AMF. The first information may include uplink information of the terminal, downlink information of the AMF, a configuration for an air interface resource between the terminal and the AMF, and the air interface channel quality.

Schematically, the configuration for the air interface resource includes at least one of a resource period or a Packet Data Convergence Protocol (PDCP) discard timer.

Schematically, the statistic duration refers to time taken to gather statistics on a piece of information or a plurality of pieces of information. For example, the first information includes the uplink information, the downlink information, and the statistical duration that includes two statistical durations, which are time taken to gather statistics on the uplink information and time taken to gather statistics on the downlink information.

According to the operation at block 102, the second network entity is able to obtain the first information transmitted by the first network entity. Then, one or more of the transmission demand, the QoS parameter, and the QoS configuration are adjusted by the second network entity based on the first information.

For example, the first network entity is the terminal, and the second network entity is the PCF or the SMF or the AMF. The terminal is configured to report to the PCF or the SMF or the AMF the air interface channel quality and the average value of all PDU sessions of the terminal. A communication quality between the terminal and the PCF or the SMF or the AMF may be determined by the PCF or the SMF or the AMF based on the air interface channel quality and the average value that are reported by the terminal. Then, the QoS parameter is adjusted by the PCF or the SMF or the AMF based on the information reported by the terminal, improving the communication quality between the terminal and the PCF or the SMF or the AMF.

In an optional implementation scenario, the first network entity is the terminal. The terminal is configured to transmit the first information to the network device. The network device is configured to report the received first information or information relevant to the first information to the second network entity, e.g., the core network device or the AF or the application server or the CNC node or the data network node. Then, the transmission demand or the QoS demand or the QoS configuration is adjusted by the core network device or the AF or the application server or the CNC node or the data network node based on the reported information.

In another optional implementation scenario, the first network entity is the terminal, and the second network entity is the network device. Optionally, the network device is a base station, such as a gNB. The terminal is configured to report the first information or the information relevant to the first information to the base station. The base station is configured to allocate a resource, or adjust a transmission configuration, or adjust the transmission demand or the QoS demand or the QoS configuration, based on the reported information subsequent to reception of the relevant information.

As an example, the first network entity is the network device or the terminal, and the second network entity is the core network device. The network device may be the access network device, such as a base station. The terminal may be a UE. The core network device may be at least one of the AMF, the SMF, or the PCF. Optionally, the network device can be configured to directly report the first information or the information relevant to the first information to the second network entity, or the processed first information or the information relevant to the first information to the second network entity. For example, the UE is configured to report relevant information of each UE, and the network device is configured to report the relevant information of each UE or relevant information of each cell or relevant information of each base station. For example, the UE is configured to report relevant information of each QoS flow of each UE, and the network device is configured to report relevant information of each service or relevant information of each cell or relevant information of each base station.

In summary, with the QoS adjustment method provided by the embodiments of the present disclosure, the air interface, the RAN, or the transmission related information is taken into consideration by the second network entity based on the first information transmitted by the first network entity, thereby adjusting the transmission demand or the QoS parameter or the QoS configuration accordingly.

FIG. 3 illustrates a flowchart of a QoS adjustment method according to an example embodiment of the present disclosure. The method is applied in the communication system illustrated in FIG. 1. The QoS adjustment method provided by the embodiments of the present disclosure includes operations at blocks.

At Block 202, First Information Transmitted by a First Network Entity is Received by a Second Network Entity.

Schematically, the first information is used to adjust a transmission demand or a QoS parameter or a QoS configuration.

The first information includes at least one of information relevant to an air interface, information relevant to an RAN, or information relevant to a terminal.

Optionally, the first network entity includes at least one of a network device or a terminal. The network device at least includes an access network device, such as a gNB. Optionally, the second network entity includes at least one of an AMF, an SMF, a PCF, an AF, an application server, a data network node, a CNC node, or an access network device.

According to the above contents, the first information has a granularity unit of one of: a PLMN; an AMF; a UPF; an SMF; a network device; a cell; a terminal; at least two UPFs for a same service; at least two SMFs for a same service; at least two terminals in an active state; at least two terminals in a connected state; at least two terminals in an inactive state; at least two terminals in a non-idle state; a single QoS flow; an average value of at least two QoS flows; a PDU session; an average value of at least two PDU sessions; a single data stream; an average value of at least two data streams; a single frame; an average value of at least two frames; a single data packet; an average value of at least two data packets; a single application; an average value of at least two applications; a single application data unit; an average value of at least two application data units; a single logical channel; an average value of at least two logical channels; a single carrier; and an average value of at least two carriers.

Optionally, in a case where the granularity unit of the first information is a terminal, the first information transmitted by the first network entity to the second network entity includes at least one of: (relevant information of) the single QoS flow; the average value of (relevant information of) the at least two QoS flows; (relevant information of) the single data stream; the average value of (relevant information of) the at least two data streams; (relevant information of) the single PDU session; the average value of (relevant information of) the at least two PDU sessions; (relevant information of) the single frame; the average value of (relevant information of) the at least two frames; (relevant information of) the single data packet; the average value of (relevant information of) the at least two data packets; (relevant information of) the single application; the average value of (relevant information of) the at least two applications; (relevant information of) the single application data unit; the average value of (relevant information of) the at least two application data units; (relevant information of) the single logical channel; the average value of (relevant information of) the at least two logical channels; (relevant information of) the single carrier; or the average value of (relevant information of) the at least two carriers.

At Block 204, a Transmission Demand or a QoS Parameter or a QoS Configuration is Adjusted by the Second Network Entity Based on the First Information.

According to the above contents, the content of the first information includes at least one of: uplink information; downlink information; the uplink information and the downlink information; an air interface channel quality; a quantity of terminals that have accessed; a quantity of activated PDU sessions; a transmission delay; a transmission error rate; a packet loss rate; a resource utilization rate; an LBT failure probability; a configuration for an air interface resource; a load of the air interface resource; a bandwidth of the air interface resource; a frequency point of the air interface resource; or a statistical duration.

According to the operation at block 202, the above information may be obtained by the second network entity. Based on this, the transmission demand or the QoS parameter or the QoS configuration can be adjusted by the second network entity to improve the communication quality.

Schematically, each of the transmission demand, the QoS parameter, and the QoS configuration may be for the first network entity and/or the second network entity, or for other devices that are distinct from the first network entity and the second network entity. For example, the first network entity is a first terminal, and the second network entity is a PCF. The PCF is configured to adjust a QoS parameter of a second terminal based on the first information reported by the first terminal.

Optionally, the operation at block 204 can be implemented as: adjusting, by the second network entity based on the first information, the transmission demand or a QoS parameter of a QoS flow or a QoS configuration of the QoS flow; or adjusting, by the second network entity based on the first information, the transmission demand or the QoS parameter of the QoS flow or the QoS configuration of the QoS flow in accordance with a granularity unit by which the first information is transmitted; or adjusting, by the second network entity based on the first information, all configured or activated transmission demands, or QoS parameters of all configured or activated QoS flows, or QoS configurations of all configured or activated QoS flows.

Optionally, the description "adjusting, by the second network entity based on the first information, all configured or activated transmission demands" means adjusting, by the second network entity based on the first information, one configured transmission demand, or a plurality of configured transmission demands, or all the configured transmission demands, or one activated transmission demand, or a plurality of activated transmission demands, or all the activated transmission demands. Similarly, each of the description "adjusting QoS parameters of all configured or activated QoS flows" and the description "adjusting QoS configurations of all configured or activated QoS flows" has meanings similar to those described above, and thus details thereof will be omitted here.

For example, in a case where the first network entity is the terminal and the second network entity is the SMF, the first information reported by the terminal to the SMF includes the air interface channel quality and the transmission delay. The SMF is configured to adjust the QoS configuration of the QoS flow subsequent to obtaining of the above information, to meet requirements of a communication quality between the terminal and the SMF.

For example, in a case where the first network entity is the network device and the second network entity is the AF, the granularity unit of the first information is a single QoS flow. The AF is configured to adjust QoS parameters of individual QoS flows sequentially in units of a single QoS flow, subsequent to reception of the first information.

For example, in a case where the first network entity is a terminal and the second network entity is an application server, the activated transmission demand is adjusted by the application server based on the first information reported by the terminal.

In an optional implementation scenario, the first network entity is the terminal. The terminal is configured to transmit the first information to the network device. The network device is configured to report the received first information or the information relevant to the first information to the second network entity, e.g., the core network device or the AF or the application server or the CNC node or the data network node. Then, the transmission demand or the QoS demand or the QoS configuration is adjusted by the core network device or the AF or the application server or the CNC node or the data network node based on the reported information.

In another optional implementation scenario, the first network entity is the terminal, and the second network entity is the network device. Optionally, the network device is a base station, such as a gNB. The terminal is configured to report the first information or information relevant to the first information to the base station. The base station is configured to allocate a resource, or adjust a transmission configuration, or adjust the transmission demand or the QoS demand or the QoS configuration, based on the reported information subsequent to reception of the relevant information.

As an example, the first network entity is the network device or the terminal, and the second network entity is the core network device. The network device may be the access network device, such as a base station. The terminal may be a UE. The core network device may be at least one of the AMF, the SMF, or the PCF. Optionally, the network device can be configured to directly report the first information or the information relevant to the first information to the second network entity, or the processed first information or the information relevant to the first information to the second network entity. For example, the UE is configured to report relevant information of each UE, and the network device is configured to report the relevant information of each UE or relevant information of each cell or relevant information of each base station. For example, the UE is configured to report relevant information of each QoS flow of each UE, and the network device is configured to report relevant information of each service or relevant information of each cell or relevant information of each base station.

Schematically, FIG. 4 illustrates a flowchart of a QoS adjustment method according to an example embodiment of the present disclosure. The method is applied in the communication system illustrated in FIG. 1 and applied between a first network entity and a second network entity. The QoS adjustment method provided by the embodiments of the present disclosure includes operations at blocks.

At block 302, first information is transmitted to the second network entity by the first network entity.

Schematically, the first information is used to adjust a transmission demand or a QoS parameter or a QoS configuration.

The first information includes at least one of information relevant to an air interface, information relevant to an RAN, or information relevant to a terminal.

Optionally, the first network entity includes at least one of a network device or a terminal. The network device at least includes an access network device, such as a gNB. Optionally, the second network entity includes at least one of an AMF, an SMF, a PCF, an AF, an application server, a data network node, a CNC node, or an access network device.

According to the above contents, the first information has a granularity unit of one of: a PLMN; an AMF; a UPF; an SMF; a network device; a cell; a terminal; at least two UPFs for a same service; at least two SMFs for a same service; at least two terminals in an active state; at least two terminals in a connected state; at least two terminals in an inactive state; at least two terminals in a non-idle state; a single QoS flow; an average value of at least two QoS flows; a PDU session; an average value of at least two PDU sessions; a single data stream; an average value of at least two data streams; a single frame; an average value of at least two frames; a single data packet; an average value of at least two data packets; a single application; an average value of at least two applications; a single application data unit; an average value of at least two application data units; a single logical channel; an average value of at least two logical channels; a single carrier; and an average value of at least two carriers.

Schematically, the operation at block 302 is the same as the operation at block 102. Reference to the operation at block 302 can be made to the operation at block 102, and thus details thereof will be omitted here.

At block 304, the first information is received by the second network entity.

According to the above contents, the content of the first information includes at least one of: uplink information; downlink information; the uplink information and the downlink information; an air interface channel quality; a quantity of terminals that have accessed; a quantity of activated PDU sessions; a transmission delay; a transmission error rate; a packet loss rate; a resource utilization rate; an LBT failure probability; a configuration for an air interface resource; a load of the air interface resource; a bandwidth of the air interface resource; a frequency point of the air interface resource; or a statistical duration.

At block 306, a transmission demand or a QoS parameter or a QoS configuration is adjusted by the second network entity based on the first information.

According to the operation at block 304, the above information may be obtained by the second network entity. Based on this, the transmission demand or the QoS parameter or the QoS configuration can be adjusted by the second network entity to improve the communication quality.

Schematically, the operations at block 304 and block 306 are the same as the operations at block 202 and block 204. Reference to the operations at block 304 and block 306 can be made to the operations at block 202 and block 204, and thus details thereof will be omitted here.

In summary, with the QoS adjustment method provided by the embodiments of the present disclosure, the air interface, the RAN, or the transmission related information is taken into consideration by the second network entity based on the received first information transmitted by the first network entity, thereby adjusting the transmission demand or the QoS parameter or the QoS configuration.

During a QoS adjustment, the first information may be transmitted in various ways. For example, the first information is transmitted periodically by the first network entity. Schematically, as illustrated in FIG. 5 and FIG. 6, the embodiments of the present disclosure provide two optional ways of transmitting the first information.

Schematically, in the following embodiments, steps on a first network entity side may be interpreted as an embodiment of the QoS adjustment method alone, and steps on a second network entity side may as well be interpreted as an embodiment of the QoS adjustment method alone. Reference to a specific elaboration of the steps of the QoS adjustment method can be made to the following contents.

Figure 5:
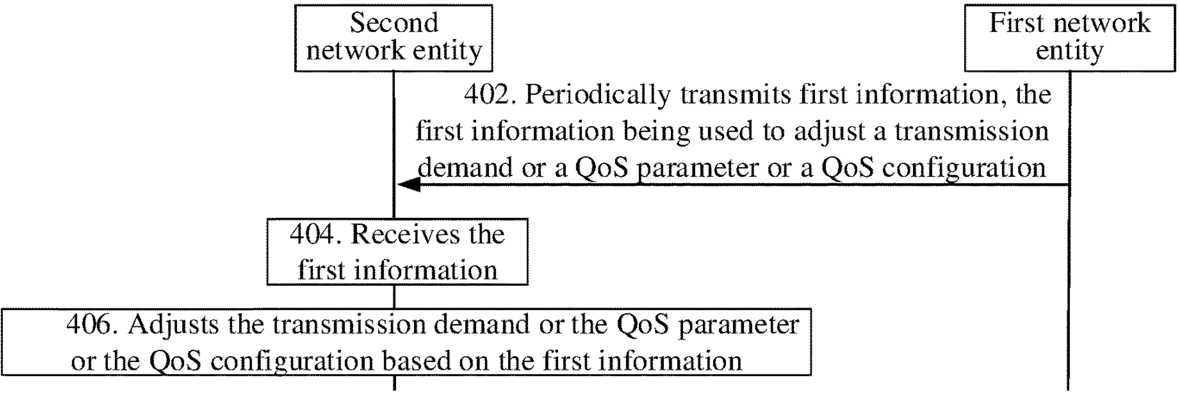
FIG. 5 is a flowchart illustrating a QoS adjustment method according to an example embodiment of the present disclosure.
Figure 6:
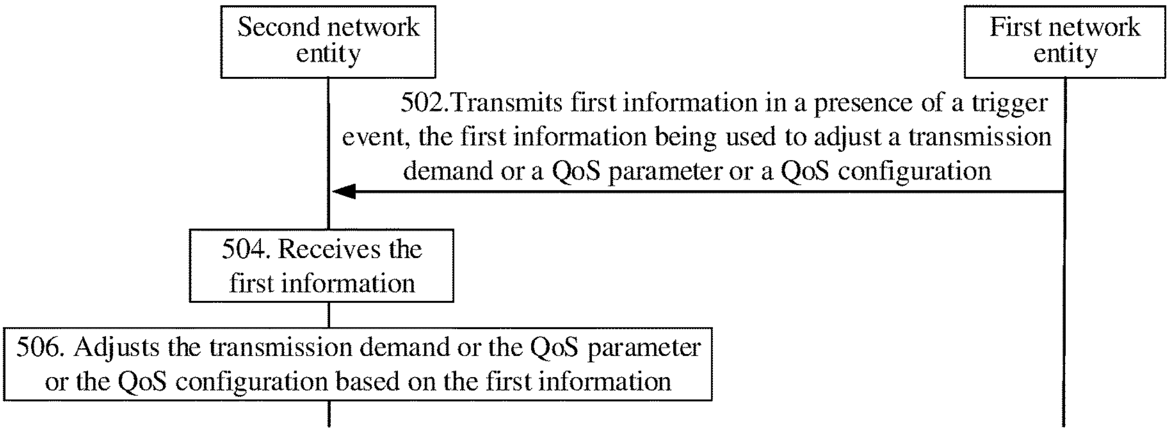
FIG. 6 is a flowchart illustrating a QoS adjustment method according to an example embodiment of the present disclosure.

FIG. 5 illustrates a flowchart of a QoS adjustment method according to an example embodiment of the present disclosure. The method is applied in the communication system illustrated in FIG. 1. The QoS adjustment method provided by the embodiments of the present disclosure includes operations at blocks.

At block 402, first information is periodically transmitted to a second network entity by a first network entity.

Schematically, the first information is used to adjust a transmission demand or a QoS parameter or a QoS configuration.

The first information includes at least one of information relevant to an air interface, information relevant to an RAN, or information relevant to a terminal.

Optionally, the first network entity includes at least one of a network device or a terminal. Optionally, the second network entity includes at least one of an AMF, an SMF, a PCF, an AF, an application server, a data network node, a CNC node, or an access network device.

Reference to relevant description of the granularity and content of the first information can be made to the above contents, and thus details thereof will be omitted here.

A transmission period of the first information may be set as practically needed. The present disclosure is not limited in this regard. Optionally, the transmission period may be a first predetermined period specified in the communication standard, or a second predetermined period configured by the second network entity for the first network entity, or a third predetermined period configured by another network entity for the first network entity, or a fourth predetermined period determined by other setting methods. The setting method for the fourth predetermined period may be set as practically needed. The present disclosure is not limited in this regard.

For example, the transmission period of the first information is a fixed period configured by the second network entity for the first network entity. The first network entity is configured to transmit the first information to the second network entity once for every elapsed length of the fixed period.

For example, the transmission period of the first information is coordinated between the second network entity and the first network entity.

At block 404, the first information is received by the second network entity.

According to the above contents, the content of the first information includes at least one of: uplink information; downlink information; the uplink information and the downlink information; an air interface channel quality; a quantity of terminals that have accessed; a quantity of activated PDU sessions; a transmission delay; a transmission error rate; a packet loss rate; a resource utilization rate; an LBT failure probability; a configuration for an air interface resource; a load of the air interface resource; a bandwidth of the air interface resource; a frequency point of the air interface resource; or a statistical duration.

At block 406, the transmission demand or the QoS parameter or the QoS configuration is adjusted by the second network entity based on the first information.

According to the operation at block 404, the above information may be obtained by the second network entity. Based on this, the transmission demand or the QoS parameter or the QoS configuration may be adjusted by the second network entity to improve the communication quality.

Schematically, the operations at block 404 and block 406 are the same as the operations at block 202 and block 204. Reference to the operations at block 404 and block 406 can be made to the operations at block 202 and block 204, and thus details thereof will be omitted here.

FIG. 6 illustrates a flowchart of a QoS adjustment method according to an example embodiment of the present disclosure. The method is applied in the communication system illustrated in FIG. 1. The QoS adjustment method provided by the embodiments of the present disclosure includes operations at blocks.

At block 502, the first information is transmitted to the second network entity by the first network entity in a presence of a trigger event.

Schematically, the first information is used to adjust a transmission demand or a QoS parameter or a QoS configuration.

The first information includes at least one of information relevant to an air interface, information relevant to an RAN, or information relevant to a terminal.

Optionally, the first network entity includes at least one of a network device or a terminal. The network device at least includes an access network device, such as a gNB. Optionally, the second network entity includes at least one of an AMF, an SMF, a PCF, an AF, an application server, a data network node, a CNC node, or an access network device.

Reference to relevant description of the granularity and content of the first information can be made to the above contents, and thus details thereof will be omitted here.

The trigger event for transmitting the first information may be set as practically needed. The present disclosure is not limited in this regard. Optionally, the trigger event may be a trigger event specified in the communication standard, or may be configured by the second network entity for the first network entity.

Optionally, the first network entity is configured to transmit the first information to the second network entity when the QoS demand fails to meet a predetermined requirement. The predetermined requirement may be defined as practically needed. The present disclosure is not limited in this regard.

Optionally, the trigger event includes transmission of trigger signaling. For example, the second network entity is configured to transmit the trigger signaling to the first network entity. The first network entity is configured to transmit the first information to the second network entity in response to receiving the trigger signaling.

Optionally, the trigger event includes transmission of a trigger request message. For example, the trigger request message is transmitted by the first network entity to the second network entity, and then the first information is transmitted by the first network entity to the second network entity. Or, the first information is transmitted by the first network entity to the second network entity subsequent to reception of feedback from the trigger request message.

Optionally, the trigger event includes a communication quality between the first network entity and the second network entity failing to satisfy a predetermined threshold or a predetermined range. In an optional implementation scenario, the communication quality may be reflected by parameters such as a signal-to-noise ratio, a bit error rate, a packet loss rate, etc. In another optional implementation scenario, the communication quality may be reflected by the content included in the first information. For example, the trigger event is that an air interface channel quality between the first network entity and the second network entity is lower than a first predetermined threshold. For example, the trigger event is that a transmission error rate between the first network entity and the second network entity is higher than a second predetermined threshold. For example, the trigger event is that a load of an air interface resource exceeds a predetermined load range.

At block 504, the first information is received by the second network entity.

According to the above contents, the content of the first information includes at least one of: uplink information; downlink information; the uplink information and the downlink information; an air interface channel quality; a quantity of terminals that have accessed; a quantity of activated PDU sessions; a transmission delay; a transmission error rate; a packet loss rate; a resource utilization rate; an LBT failure probability; a configuration for an air interface resource; a load of the air interface resource; a bandwidth of the air interface resource; a frequency point of the air interface resource; or a statistical duration.

At block 506, the transmission demand or the QoS parameter or the QoS configuration is adjusted by the second network entity based on the first information.

According to the operation at block 504, the above information may be obtained by the second network entity. Based on this, the transmission demand or the QoS parameter or the QoS configuration may be adjusted by the second network entity to improve the communication quality.

Schematically, the operations at block 504 and block 506 are the same as the operations at block 202 and block 204. Reference to the operations at block 504 and block 506 can be made to the operations at block 202 and block 204, and thus details thereof will be omitted here.

In summary, the QoS adjustment method provided by the embodiments of the present disclosure provides specific implementation methods for transmitting the first information by the first network entity, which include two optional implementation methods: periodical transmission, and transmission in the presence of the trigger event. Based on this, the transmission demand or the QoS parameter or the QoS configuration can be adjusted by the second network entity based on the received first information.

FIG. 7 illustrates a flowchart of a QoS adjustment method according to an example embodiment of the present disclosure. The method is applied in the communication system illustrated in FIG. 1.

Schematically, in this embodiment, steps on a first network entity side may be interpreted as an embodiment of the QoS adjustment method alone, and steps on a second network entity side may as well be interpreted as an embodiment of the QoS adjustment method alone. Reference to a specific elaboration of the steps of the QoS adjustment method can be made to the following contents. The QoS adjustment method provided by the embodiments of the present disclosure includes operations at blocks.

At block 602, instruction information is transmitted to a first network entity by a second network entity.

Schematically, the instruction information is used to instruct the first network entity to transmit first information. The first information is used to adjust a transmission demand or a QoS parameter or a QoS configuration.

Optionally, the first network entity includes at least one of a network device or a terminal. The network device at least includes an access network device, such as a gNB. Optionally, the second network entity includes at least one of an AMF, an SMF, a PCF, an AF, an application server, a data network node, a CNC node, or an access network device.

In an optional implementation scenario, the instruction information may also be transmitted by another network entity to the second network entity, for instructing the second network entity to transmit the first information to the first network entity. The other network entity is an entity distinct from the second network entity, including but not limited to at least one of a terminal, a network device, an AMF, an SMF, a PCF, an AF, an application server, a data network node, or a CNC node. For example, in a case where the first network entity is a first terminal and the second network entity is an application server, the other network entity is a second terminal. The second terminal is configured to transmit instruction information to the first terminal. The instruction information is used to instruct the first terminal to transmit the first information to the application server.

Schematically, the instruction information is carried in Non-Access Stratum (NAS) signaling; or the instruction information is carried in system information; or the instruction information is carried in Radio Resource Control (RRC) signaling. For example, the first network entity is a terminal, and the second network entity is an SMF. The SMF is configured to transmit the instruction information to the terminal via the NAS signaling.

In an optional implementation scenario, the first network entity is a terminal (e.g., a UE), and the second network entity is a core network device. The instruction information may be transmitted via the access network device or the core network device. The access network device may be a base station, such as a gNB. The core network device may be at least one of an AMF, an SMF, or a PCF. Optionally, when the instruction information is transmitted via the access network device, the instruction information is carried in the system information or the RRC signaling. When the instruction information is transmitted via the core network device, the instruction information is carried in the NAS signaling.

For example, in a case where the first network entity is a terminal and the second network entity is a core network device, the instruction information is transmitted by the access network device (e.g., a gNB) to the terminal via the RRC signaling or the system information, in which the instruction information is used to instruct the terminal to transmit the first information to the core network device; or the instruction information is transmitted by the core network device to the terminal via the NAS signaling.

For example, in a case where the first network entity is the terminal and the second network entity is the access network device, the access network device may be a base station, such as a gNB. The base station is configured to transmit the instruction information to the terminal via the RRC signaling. Or, the base station is configured to transmit the instruction information to the terminal via the system information.

At block 603, the instruction information is received by the first network entity.

Schematically, the instruction information is used to instruct the first network entity to transmit the first information. The first information is used to adjust the transmission demand or the QoS parameter or the QoS configuration.

According to the operation at block 602, the first network entity is able to receive the instruction information, and transmit the first information based on the instruction information. For example, the second network entity is configured to transmit the instruction information to the first network entity via the NAS signaling. The instruction information is used to instruct the first network entity to report a configuration for, a load of, a bandwidth of, and a frequency point of the air interface resource.

At block 604, the first information is transmitted to the second network entity by the first network entity.

Schematically, the first information is used to adjust the transmission demand or the QoS parameter or the QoS configuration.

According to the above contents, the first information includes at least one of: information relevant to an air interface; information relevant to an RAN; or information relevant to a terminal.

According to the above contents, the first information has a granularity unit of one of: a PLMN; an AMF; a UPF; an SMF; a network device; a cell; a terminal; at least two UPFs for a same service; at least two SMFs for a same service; at least two terminals in an active state; at least two terminals in a connected state; at least two terminals in an inactive state; at least two terminals in a non-idle state; a single QoS flow; an average value of at least two QoS flows; a PDU session; an average value of at least two PDU sessions; a single data stream; an average value of at least two data streams; a single frame; an average value of at least two frames; a single data packet; an average value of at least two data packets; a single application; an average value of at least two applications; a single application data unit; an average value of at least two application data units; a single logical channel; an average value of at least two logical channels; a single carrier; and an average value of at least two carriers.

Schematically, the operation at block 604 is the same as the operation at block 102. Reference to the operation at block 604 can be made to the operation at block 102, and thus details thereof will be omitted here.

At block 605, the first information is received by the second network entity.

According to the above contents, the content of the first information includes at least one of: uplink information; downlink information; the uplink information and the downlink information; an air interface channel quality; a quantity of terminals that have accessed; a quantity of activated PDU sessions; a transmission delay; a transmission error rate; a packet loss rate; a resource utilization rate; an LBT failure probability; a configuration for an air interface resource; a load of the air interface resource; a bandwidth of the air interface resource; a frequency point of the air interface resource; or a statistical duration.

At block 606, the transmission demand or the QoS parameter or the QoS configuration is adjusted by the second network entity based on the first information.

According to the operation at block 605, the above information may be obtained by the second network entity. Based on this, the transmission demand or the QoS parameter or the QoS configuration may be adjusted by the second network entity to improve the communication quality.

Schematically, the operations at block 605 and block 606 are the same as the operations at block 202 and block 204. Reference to the operations at block 605 and block 606 can be made to the operations at block 202 and block 204, and thus details thereof will be omitted here.

In summary, with the QoS adjustment method provided by the embodiments of the present disclosure, the first information is transmitted to the second network entity by the first network entity based on the received instruction information, thereby enabling the second network entity to adjust, based on the first information, the transmission demand or the QoS parameter or the QoS configuration.

FIG. 8 illustrates a flowchart of a QoS adjustment method according to an example embodiment of the present disclosure. The method is applied in the communication system illustrated in FIG. 1.

Schematically, in this embodiment, steps on a first network entity side may be interpreted as an embodiment of the QoS adjustment method alone, and steps on a second network entity side may as well be interpreted as an embodiment of the QoS adjustment method alone. Reference to a specific elaboration of the steps of the QoS adjustment method can be made to the following contents. The QoS adjustment method provided by the embodiments of the present disclosure includes operations at blocks.

At block 702, first information is measured or collected by a first network entity.

Schematically, the first information is used to adjust a transmission demand or a QoS parameter or a QoS configuration.

Optionally, the first network entity includes at least one of a network device or a terminal.

According to the above contents, the first information includes at least one of: information relevant to an air interface; information relevant to an RAN; or information relevant to a terminal.

Reference to a specific elaboration of the granularity unit and the content of the first information can be made to the above contents, and thus details thereof will be omitted here.

Depending on the granularity unit and/or content of the first information, the first information is obtained in different ways, including two obtaining ways of measurement and collection.

For example, the first network entity is a network device, and the first information is an air interface channel quality, a quantity of terminals that have accessed, a quantity of activated PDU sessions, and a statistical duration. The air interface channel quality and the statistical duration may be measured by the network device. The quantity of terminals that have accessed and the quantity of activated PDU sessions may be collected by the network device.

In an optional implementation scenario, the first information may be reported by the terminal to the access network device; or the first information may be generated by the access network device subsequent to a processing performed by the access network device on information reported by the terminal.

In an optional implementation scenario, the first information may further be measured by a second network entity.

At block 703, the first information is transmitted to a second network entity by a first network entity.

According to the above contents, the first information is used to adjust a transmission demand or a QoS parameter or a QoS configuration.

Reference to a relevant elaboration of the first information can be made to the above contents, and thus details thereof will be omitted here.

Optionally, the second network entity includes at least one of an AMF, an SMF, a PCF, an AF, an application server, a data network node, a CNC node, or an access network device.

Schematically, the operation at block 703 is the same as the operation at block 102. Reference to the operation at block 703 can be made to the operation at block 102, and thus details thereof will be omitted here.

At block 704, the first information is received by the second network entity.

According to the above contents, the content of the first information includes at least one of: uplink information; downlink information; the uplink information and the downlink information; an air interface channel quality; a quantity of terminals that have accessed; a quantity of activated PDU sessions; a transmission delay; a transmission error rate; a packet loss rate; a resource utilization rate; an LBT failure probability; a configuration for an air interface resource; a load of the air interface resource; a bandwidth of the air interface resource; a frequency point of the air interface resource; or a statistical duration.

At block 705, a transmission demand or a QoS parameter or a QoS configuration is adjusted by the second network entity based on the first information.

According to the operation at block 704, the above information may be obtained by the second network entity. Based on this, the transmission demand or the QoS parameter or the QoS configuration may be adjusted by the second network entity to improve the communication quality.

Schematically, the operations at block 704 and block 705 are the same as the operations at block 202 and block 204. Reference to the operations at block 704 and block 705 can be made to the operations at block 202 and block 204, and thus details thereof will be omitted here.

Schematically, various embodiments of the QoS adjustment method provided in the above contents may be combined arbitrarily. The present disclosure is not limited in this regard. As illustrated in FIG. 9 and FIG. 10, the embodiments of the present disclosure provide the following two optional embodiments, to adjust a transmission demand or a QoS parameter or a QoS configuration by a second network entity.

FIG. 9 illustrates a flowchart of a QoS adjustment method according to an example embodiment of the present disclosure. The method is applied in the communication system illustrated in FIG. 1. As an example, the first network entity is a base station and the second network entity is a core network device. The QoS adjustment method provided by the embodiments of the present disclosure includes operations at blocks.

At block 802, instruction information is transmitted to the base station by the core network device.

Schematically, the instruction information is used to instruct the base station to transmit first information. The first information is used to adjust a transmission demand or a QoS parameter or a QoS configuration.

Schematically, the instruction information is carried in NAS signaling; or the instruction information is carried in system information; or the instruction information is carried in RRC signaling.

At block 803, the instruction information is received by the base station.

According to the operation at block 802, the base station is able to receive the instruction information, and transmit the first information based on the instruction information.

At block 804, the first information is transmitted to the core network device by the base station.

Schematically, the first information is used to adjust a transmission demand or a QoS parameter or a QoS configuration.

According to the above contents, the first information includes at least one of: information relevant to an air interface; information relevant to an RAN; or information relevant to a terminal.

According to the above contents, the first information has a granularity unit of one of: a PLMN; an AMF; a UPF; an SMF; a network device; a cell; a terminal; at least two UPFs for a same service; at least two SMFs for a same service; at least two terminals in an active state; at least two terminals in a connected state; at least two terminals in an inactive state; at least two terminals in a non-idle state; a single QoS flow; an average value of at least two QoS flows; a PDU session; an average value of at least two PDU sessions; a single data stream; an average value of at least two data streams; a single frame; an average value of at least two frames; a single data packet; an average value of at least two data packets; a single application; an average value of at least two applications; a single application data unit; an average value of at least two application data units; a single logical channel; an average value of at least two logical channels; a single carrier; and an average value of at least two carriers.

Schematically, the operation at block 804 is the same as the operation at block 102. Reference to the operation at block 804 can be made to the operation at block 102, and thus details thereof will be omitted here.

At block 805, the first information is received by the core network device.

According to the above contents, the content of the first information includes at least one of: uplink information; downlink information; the uplink information and the downlink information; an air interface channel quality; a quantity of terminals that have accessed; a quantity of activated PDU sessions; a transmission delay; a transmission error rate; a packet loss rate; a resource utilization rate; an LBT failure probability; a configuration for an air interface resource; a load of the air interface resource; a bandwidth of the air interface resource; a frequency point of the air interface resource; or a statistical duration.

At block 806, a transmission demand or a QoS parameter or a QoS configuration is adjusted by the core network device based on the first information.

According to the operation at block 805, the above information may be obtained by the core network device. Based on this, the transmission demand or the QoS parameter or the QoS configuration may be adjusted by the core network device to improve the communication quality.

Schematically, the operations at block 805 and block 806 are the same as the operations at block 202 and block 204. Reference to the operations at block 805 and block 806 can be made to the operations at block 202 and block 204, and thus details thereof will be omitted here.

FIG. 10 illustrates a flowchart of a QoS adjustment method according to an example embodiment of the present disclosure. The method is applied in the communication system illustrated in FIG. 1. As an example, the first network entity is a terminal and the second network entity is a core network device. The QoS adjustment method provided by the embodiments of the present disclosure includes operations at blocks.

At block 902, instruction information is transmitted to the terminal by the core network device.

Schematically, the instruction information is used to instruct the terminal to transmit first information. The first information is used to adjust a transmission demand or a QoS parameter or a QoS configuration.

Schematically, the instruction information is carried in NAS signaling; or the instruction information is carried in system information; or the instruction information is carried in RRC signaling.

At block 903, the instruction information is received by the terminal.

According to the operation at block 902, the terminal is able to receive the instruction information, and transmit the first information based on the instruction information. For example, the core network device is configured to transmit the instruction information to the terminal via the NAS signaling. The instruction information is used to instruct the terminal to report a configuration for, a load of, a bandwidth of, and a frequency point of the air interface resource.

At block 904, the first information is transmitted to the core network device by the terminal.

Schematically, the first information is used to adjust a transmission demand or a QoS parameter or a QoS configuration.

According to the above contents, the first information includes at least one of: information relevant to an air interface; information relevant to an RAN; or information relevant to a terminal.

According to the above contents, the first information has a granularity unit of one of: a PLMN; an AMF; a UPF; an SMF; a network device; a cell; a terminal; at least two UPFs for a same service; at least two SMFs for a same service; at least two terminals in an active state; at least two terminals in a connected state; at least two terminals in an inactive state; at least two terminals in a non-idle state; a single QoS flow; an average value of at least two QoS flows; a PDU session; an average value of at least two PDU sessions; a single data stream; an average value of at least two data streams; a single frame; an average value of at least two frames; a single data packet; an average value of at least two data packets; a single application; an average value of at least two applications; a single application data unit; an average value of at least two application data units; a single logical channel; an average value of at least two logical channels; a single carrier; and an average value of at least two carriers.

Schematically, the operation at block 904 is the same as the operation at block 102. Reference to the operation at block 904 can be made to the operation at block 102, and thus details thereof will be omitted here.

At block 905, the first information is received by the core network device.

According to the above contents, the content of the first information includes at least one of: uplink information; downlink information; the uplink information and the downlink information; an air interface channel quality; a quantity of terminals that have accessed; a quantity of activated PDU sessions; a transmission delay; a transmission error rate; a packet loss rate; a resource utilization rate; an LBT failure probability; a configuration for an air interface resource; a load of the air interface resource; a bandwidth of the air interface resource; a frequency point of the air interface resource; or a statistical duration.

At block 906, a transmission demand or a QoS parameter or a QoS configuration is adjusted by the core network device based on the first information.

According to the operation at block 905, the above information may be obtained by the core network device. Based on this, the transmission demand or the QoS parameter or the QoS configuration may be adjusted by the core network device to improve the communication quality.

Schematically, the operations at block 905 and block 906 are the same as the operations at block 202 and block 204. Reference to the operations at block 905 and block 906 can be made to the operations at block 202 and block 204, and thus details thereof will be omitted here.

In addition to the above two optional embodiments, each of the first network entity and the second network entity may also be realized as one of the following optional combinations based on the above contents. For example, the first network entity is a terminal, and the second network entity is an AF or an application server or a data network node or a CNC node or an access network device. For example, the first network entity is a network device, and the second network entity is an AF or an application server or a data network node or a CNC node or an access network device.

Optionally, the QoS adjustment method according to the embodiments of the present disclosure may also be implemented in the following manners. For example, the first network entity is configured to receive the instruction information transmitted by the second network entity or the other network entity, measure or collect the first information based on the instruction information, and transmit the first information to the second network entity. The second network entity is configured to adjust the transmission demand or the QoS parameter or the QoS configuration based on the first information. For example, the first network entity is configured to measure or collect the first information, and periodically transmit the first information to the second network entity. The second network entity is configured to adjust the transmission demand or the QoS parameter or the QoS configuration based on the first information. For example, the first network entity is configured to measure or collect the first information, and transmit the first information to the second network entity in the presence of the trigger event. The second network entity is configured to adjust the transmission demand or the QoS parameter or the QoS configuration based on the first information. For example, the first network entity is configured to receive the instruction information transmitted by the second network entity or the other network entity, and periodically transmit the first information to the second network entity subsequent to reception of the instruction information. The second network entity is configured to adjust the transmission demand or the QoS parameter or the QoS configuration based on the first information. For example, the first network entity is configured to receive the instruction information transmitted by the second network entity or the other network entity, and transmit the first information to the second network entity in response to receiving the instruction information and in the presence of the trigger event. The second network entity is configured to adjust the transmission demand or the QoS parameter or the QoS configuration based on the first information.

In addition, there are a variety of other optional combinations, which will not be enumerated in the present disclosure.

In summary, with the QoS adjustment method provided by the embodiments of the present disclosure, the transmission demand or the QoS parameter or the QoS configuration can be adjusted by the second network entity based on the first information transmitted by the first network entity.

Figure 11:
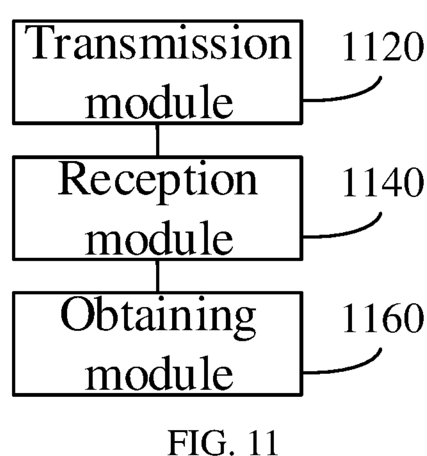
FIG. 11 is a schematic diagram showing a structure of a QoS adjustment apparatus according to an example embodiment of the present disclosure.

FIG. 11 illustrates a schematic diagram showing a structure of a QoS adjustment apparatus according to another example embodiment. The positioning apparatus may be implemented as the first network entity or part of the first network entity. The QoS adjustment apparatus includes a transmission apparatus 1120.

The transmission apparatus 1120 is configured to transmit first information to a second network entity. The first information is used to adjust a transmission demand or a QoS parameter or a QoS configuration.

In an optional embodiment, the first information includes at least one of: information relevant to an air interface; information relevant to an RAN; or information relevant to a terminal.

In an optional embodiment, the first information has a granularity unit of one of: a PLMN; an AMF); a UPF; an SMF; a network device; a cell; a terminal; at least two UPFs for a same service; at least two SMFs for a same service; at least two terminals in an active state; at least two terminals in a connected state; at least two terminals in an inactive state; at least two terminals in a non-idle state; a single QoS flow; an average value of at least two QoS flows; a single PDU session; an average value of at least two PDU sessions; a single data stream; an average value of at least two data streams; a single frame; an average value of at least two frames; a single data packet; an average value of at least two data packets; a single application; an average value of at least two applications; a single application data unit; an average value of at least two application data units; a single logical channel; an average value of at least two logical channels; a single carrier; and an average value of at least two carriers.

In an optional embodiment, a content of the first information includes at least one of: uplink information; downlink information; the uplink information and the downlink information; an air interface channel quality; a quantity of terminals that have accessed; a quantity of activated PDU sessions; a transmission delay; a transmission error rate; a packet loss rate; a resource utilization rate; an LBT failure probability; a configuration for an air interface resource; a load of the air interface resource; a bandwidth of the air interface resource; a frequency point of the air interface resource; or a statistical duration.

In an optional embodiment, the transmission module 1120 is configured to periodically transmit the first information to the second network entity; or transmit the first information to the second network entity in a presence of a trigger event.

In an optional embodiment, the apparatus further includes a reception module 1140. The reception module 1140 is configured to receive instruction information from the second network entity. The instruction information is used to instruct the first network entity to transmit the first information.

In an optional embodiment, the instruction information is carried in NAS signaling; or the instruction information is carried in system information; or the instruction information is carried in RRC signaling.

In an optional embodiment, the apparatus further includes an obtaining module 1160. The obtaining module 1160 is configured to measure or collect the first information.

In an optional embodiment, the first network entity includes at least one of a network device or a terminal.

In an optional embodiment, the second network entity includes at least one of an AMF, an SMF, a PCF, an AF, an application server, a data network node, a CNC node, or an access network device.

Figure 12:
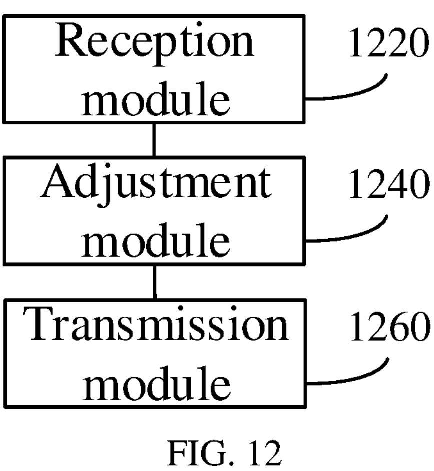
FIG. 12 is a schematic diagram showing a structure of a QoS adjustment apparatus according to an example embodiment of the present disclosure.

FIG. 12 illustrates a schematic diagram showing a structure of a QoS adjustment apparatus according to another example embodiment. The positioning apparatus may be implemented as the second network entity or part of the second network entity. The QoS adjustment apparatus includes a reception module 1220 and an adjustment module 1240.

The reception module 1220 is configured to receive first information transmitted by a first network entity.

The adjustment module 1240 is configured to adjust a transmission demand or a QoS parameter or a QoS configuration based on the first information.

In an optional embodiment, the first information includes at least one of: information relevant to an air interface; information relevant to an RAN; or information relevant to a terminal.

In an optional embodiment, the first information has a granularity unit of one of: a PLMN; an AMF; a UPF; an SMF; a network device; a cell; a terminal; at least two UPFs for a same service; at least two SMFs for a same service; at least two terminals in an active state; at least two terminals in a connected state; at least two terminals in an inactive state; at least two terminals in a non-idle state; a single QoS flow; an average value of at least two QoS flows; a single PDU session; an average value of at least two PDU sessions; a single data stream; an average value of at least two data streams; a single frame; an average value of at least two frames; a single data packet; an average value of at least two data packets; a single application; an average value of at least two applications; a single application data unit; an average value of at least two application data units; a single logical channel; an average value of at least two logical channels; a single carrier; and an average value of at least two carriers.

In an optional embodiment, a content of the first information includes at least one of: uplink information; downlink information; the uplink information and the downlink information; an air interface channel quality; a quantity of terminals that have accessed; a quantity of activated PDU sessions; a transmission delay; a transmission error rate; a packet loss rate; a resource utilization rate; an LBT failure probability; a configuration for an air interface resource; a load of the air interface resource; a bandwidth of the air interface resource; a frequency point of the air interface resource; or a statistical duration.

In an optional embodiment, the reception module 1220 is configured to: receive the first information periodically transmitted by the first network entity; or receive the first information transmitted by the first network entity. The first information is transmitted by the first network entity in a presence of a trigger event.

In an optional embodiment, the apparatus further includes a transmission module 1260. The transmission module 1260 is configured to transmit instruction information to the first network entity. The instruction information is used to instruct the first network entity to transmit the first information.

In an optional embodiment, the instruction information is carried in NAS signaling; or the instruction information is carried in system information; or the instruction information is carried in RRC signaling.

In an optional embodiment, the first information is measured or collected by the first network entity.

In an optional embodiment, the first network entity includes at least one of a network device or a terminal.

In an optional embodiment, the second network entity includes at least one of an AMF, an SMF, a PCF, an AF, a data network node, a CNC node, or an access network device.

In an optional embodiment, the adjustment module 1240 is configured to: adjust, based on the first information, the transmission demand or a QoS parameter of a QoS flow or a QoS configuration of the QoS flow; or adjust, based on the first information, the transmission demand or the QoS parameter of the QoS flow or the QoS configuration of the QoS flow in accordance with a granularity unit by which the first information is transmitted; or adjust, based on the first information, all configured or activated transmission demands, or QoS parameters of all configured or activated QoS flows, or QoS configurations of all configured or activated QoS flows.

Figure 13:
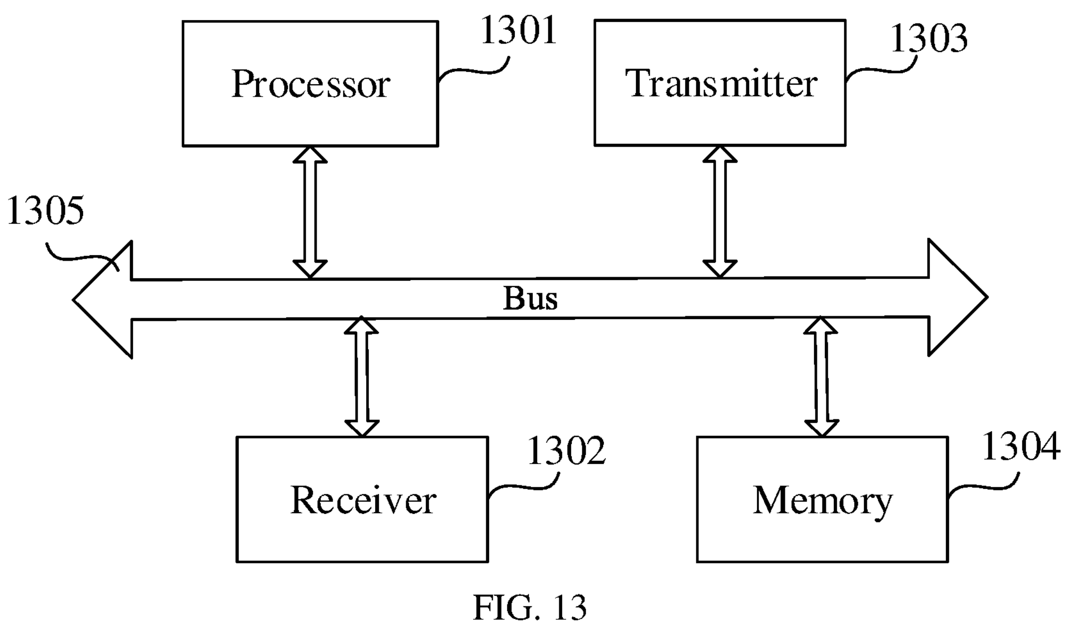
FIG. 13 is a schematic diagram showing a structure of a communication device according to an example embodiment of the present disclosure.

FIG. 13 illustrates a schematic diagram showing a structure of a communication device (a terminal or a network device) according to an example embodiment of the present disclosure. The communication device includes a processor 1301, a receiver 1302, a transmitter 1303, a memory 1304, and a bus 1305.

The processor 1301 includes one or more processing cores. The processor 1301 executes various functional applications and information processing by running a software program and modules.

The receiver 1302 and the transmitter 1303 can be implemented as a communication component. The communication component may be a communication chip.

The memory 1304 is connected to the processor 1301 through the bus 1305.

The memory 1304 can be configured to store at least one instruction. The processor 1301 is configured to execute the at least one instruction to implement the steps of the method for determining the RAR reception window mentioned in any of the above method embodiments.

In addition, the memory 1304 may be implemented by any type of volatile or non-volatile storage device or a combination thereof. The volatile or non-volatile storage device includes, but is not limited to a magnetic disk or an optical disc, an Electrically-Erasable Programmable Read-Only Memory (EEPROM), an Erasable Programmable Read-Only Memory (EPROM), a Static Random Access Memory (SRAM), a Read-Only Memory (ROM), a magnetic memory, a flash memory, and a Programmable Read-Only Memory (PROM).

While the optional embodiments of the present disclosure have been described above, the present disclosure is not limited to these embodiments. Any modification, equivalent substitution, improvement, etc., made within the ideas and principles of the present disclosure shall fall within the protection scope of the present disclosure.

What is claimed is:

1. A Quality of Service (QOS) adjustment method, comprising:

transmitting, by a first network entity, first information to a second network entity, the first information being used for the second network entity to adjust a transmission demand or a QoS parameter or a QoS configuration, wherein the first network entity is an access network device, the second network entity is a core network device; the first information comprises at least one of uplink information, downlink information, the uplink information and the downlink information, air interface channel quality, a quantity of terminals that have accessed, a quantity of activated PDU sessions, a transmission delay, a transmission error rate, a packet loss rate, a resource utilization rate, a Listen Before Talk (LBT) failure probability, a configuration for an air interface resource, a load of the air interface resource, a bandwidth of the air interface resource, a frequency point of the air interface resource, or a statistical duration; and the first information has a granularity unit of a single QoS flow.

2. The method according to claim 1, wherein said transmitting, by the first network entity, the first information to the second network entity comprises:

transmitting, by the first network entity, the first information to the second network entity periodically; or transmitting, by the first network entity, the first information to the second network entity in response to a trigger event.

3. The method according to claim 1 further comprising:

measuring or collecting, by the first network entity, the first information.

4. The method according to claim 1, wherein the second network entity comprises at least one of an AMF, an SMF, a Policy Control Function (PCF), an Application Function (AF), an application server, a data network node, a Central Network Control (CNC) node.

5. A first network entity, comprising:

a processor; and a memory having at least one program code stored thereon, wherein the at least one program code is loaded and executed by the processor to implement a QoS adjustment method, comprising:

transmitting first information to a second network entity, the first information being used for the second network entity to adjust a transmission demand or a QoS parameter or a QoS configuration, wherein the first network entity is an access network device, the second network entity is a core network device; the first information comprises at least one of uplink information, downlink information, the uplink information and the downlink information, air interface channel quality, a quantity of terminals that have accessed, a quantity of activated PDU sessions, a transmission delay, a transmission error rate, a packet loss rate, a resource utilization rate, a Listen Before Talk (LBT) failure probability, a configuration for an air interface resource, a load of the air interface resource, a bandwidth of the air interface resource, a frequency point of the air interface resource, or a statistical duration; and the first information has a granularity unit of a single QoS flow.

6. The first network entity according to claim 5, wherein the QoS adjustment method further comprises:

measuring or collecting the first information.

7. The first network entity according to claim 5, wherein the second network entity comprises at least one of an AMF, an SMF, a Policy Control Function (PCF), an Application Function (AF), an application server, a data network node, a Central Network Control (CNC) node.

8. A second network entity, comprising:

a processor; and a memory having at least one program code stored thereon, wherein the at least one program code is loaded and executed by the processor to implement a Quality of Service (QoS) adjustment method, comprising:

receiving first information transmitted by a first network entity; and adjusting, based on the first information, a transmission demand or a QoS parameter or a QoS configuration, wherein the first network entity is an access network device, the second network entity is a core network device; the first information comprises at least one of uplink information, downlink information, the uplink information and the downlink information, air interface channel quality, a quantity of terminals that have accessed, a quantity of activated PDU sessions, a transmission delay, a transmission error rate, a packet loss rate, a resource utilization rate, a Listen Before Talk (LBT) failure probability, a configuration for an air interface resource, a load of the air interface resource, a bandwidth of the air interface resource, a frequency point of the air interface resource, or a statistical duration; and the first information has a granularity unit of a single QoS flow.

9. The second network entity according to claim 8, wherein the first information is measured or collected by the first network entity.

10. The second network entity according to claim 8, wherein the second network entity comprises at least one of an AMF, an SMF, a Policy Control Function (PCF), an Application Function (AF), an application server, a data network node, a Central Network Control (CNC) node.

11. The second network entity according to claim 8, wherein said adjusting, based on the first information, the transmission demand or the QoS parameter or the QoS configuration comprises:

adjusting, based on the first information, the transmission demand or a QoS parameter of a QoS flow or a QoS configuration of the QoS flow; or adjusting, based on the first information, the transmission demand or the QoS parameter of the QoS flow or the QoS configuration of the QoS flow in accordance with a granularity unit at which the first information is transmitted; or adjusting, based on the first information, all configured or activated transmission demands, or QoS parameters of all configured or activated QoS flows, or QoS configurations of all configured or activated QoS flows.

* * * * *